(12) United States Patent
Ono

(10) Patent No.: US 9,527,078 B2
(45) Date of Patent: Dec. 27, 2016

(54) FLUID HANDLING DEVICE, FLUID HANDLING METHOD, AND FLUID HANDLING SYSTEM

(75) Inventor: Koichi Ono, Saitama (JP)

(73) Assignee: ENPLAS CORPORATION, Saitama (JP)

(*) Notice: Subject to any disclaimer, the term of this patent is extended or adjusted under 35 U.S.C. 154(b) by 75 days.

(21) Appl. No.: 14/233,892

(22) PCT Filed: Jul. 6, 2012

(86) PCT No.: PCT/JP2012/004414
§ 371 (c)(1),
(2), (4) Date: Jan. 21, 2014

(87) PCT Pub. No.: WO2013/011652
PCT Pub. Date: Jan. 24, 2013

(65) Prior Publication Data
US 2014/0130877 A1 May 15, 2014

(30) Foreign Application Priority Data

Jul. 20, 2011 (JP) ................................. 2011-158688

(51) Int. Cl.
*F16L 41/00* (2006.01)
*B01L 3/00* (2006.01)
*B01J 19/00* (2006.01)

(52) U.S. Cl.
CPC ...... *B01L 3/502738* (2013.01); *B01J 19/0093* (2013.01); *B01J 2219/0086* (2013.01);
(Continued)

(58) Field of Classification Search
CPC ............... B01L 2300/0816; B01L 2300/0867; B01L 2400/0406; B01L 2400/0688; B01L 3/502738; F16K 99/0017
(Continued)

(56) References Cited

U.S. PATENT DOCUMENTS 6,521,188 B1* 2/2003 Webster .................. 422/504
2002/0124879 A1* 9/2002 Kaplan et al. ............ 137/13
(Continued)

FOREIGN PATENT DOCUMENTS

JP 2002-355525 A 12/2002
JP 2007-232172 A 9/2007
(Continued)

OTHER PUBLICATIONS

English translation of Informal Comments filed on Nov. 20, 2012 as a reply to the Written Opinion of the International Searching Authority issued for PCT/JP2012/004414.
(Continued)

*Primary Examiner* — John Fox
*Assistant Examiner* — Reinaldo Sanchez-Medina
(74) *Attorney, Agent, or Firm* — Brundidge & Stanger, P.C.

(57) ABSTRACT

A fluid handling device (100) comprises: a first channel (130); an air reservoir (170); an air discharge port (180); a second channel (140); and a communication section (150). The first channel (130) is a channel through which a fluid can move by capillary action. The air reservoir (170) is connected to one end portion of the first channel (130), and is formed such that a through hole that communicates the air reservoir (170) with the outside can be formed. The air discharge port (180) communicates with the outside. The second channel (140) communicates with the air discharge port (180). The communication section (150) connects the first channel (130) and the second channel (140) with each other, and has a cross-sectional area smaller than the cross-sectional area of the second channel (140).

12 Claims, 21 Drawing Sheets

(52) U.S. Cl.
CPC ............ *B01J 2219/00783* (2013.01); *B01J 2219/00833* (2013.01); *B01J 2219/00885* (2013.01); *B01J 2219/00894* (2013.01); *B01J 2219/00896* (2013.01); *B01L 2200/0621* (2013.01); *B01L 2300/0816* (2013.01); *B01L 2300/0861* (2013.01); *B01L 2300/0867* (2013.01); *B01L 2400/0677* (2013.01); *B01L 2400/0688* (2013.01); *B01L 2400/0694* (2013.01); *Y10T 137/0318* (2015.04)

(58) Field of Classification Search
USPC ............. 137/561 A, 825, 828, 833, 840
See application file for complete search history.

(56) References Cited

U.S. PATENT DOCUMENTS

| | | | |
|---|---|---|---|
| 2004/0171170 A1* | 9/2004 | Sandell | ............... B01F 13/0064 436/180 |
| 2006/0166233 A1* | 7/2006 | Wu et al. | ........................ 435/6 |
| 2009/0155927 A1 | 6/2009 | Higashino et al. | |
| 2011/0045595 A1* | 2/2011 | Gauer | ................. B01F 11/0266 436/8 |
| 2011/0147408 A1 | 6/2011 | Nakajima et al. | |

FOREIGN PATENT DOCUMENTS

| | | |
|---|---|---|
| JP | 2011-025127 A | 2/2011 |
| WO | 2007/052471 A1 | 5/2007 |
| WO | 2009/136600 A1 | 11/2009 |

OTHER PUBLICATIONS

Gorkin Robert. et al., "Centrifugal Microfluidics for Biomedical Applications", Lab on a Chip, 2010, pp. 1758-1773, vol. 10, The Royal Society of Chemistry.

Jessica Melin, et al., "A Liquid-Triggered Liquid Microvalve", Transducers 2003, The 12th International Conference on Solid-State Sensors, Actuators and Microsystems, Jun. 8-12, 2003, pp. 1562-1565, Boston, the United States.

* cited by examiner

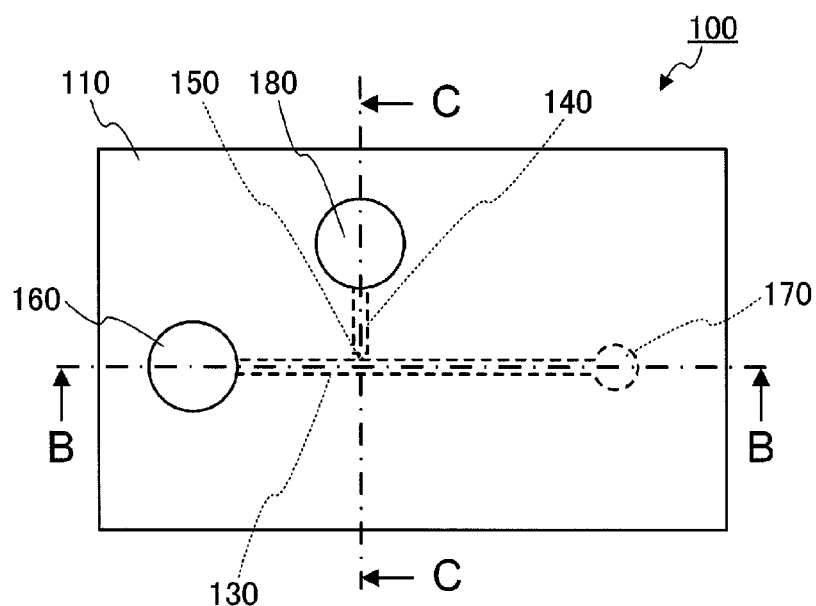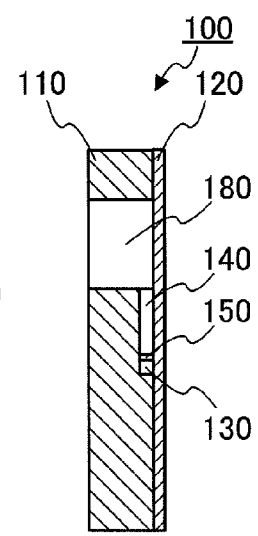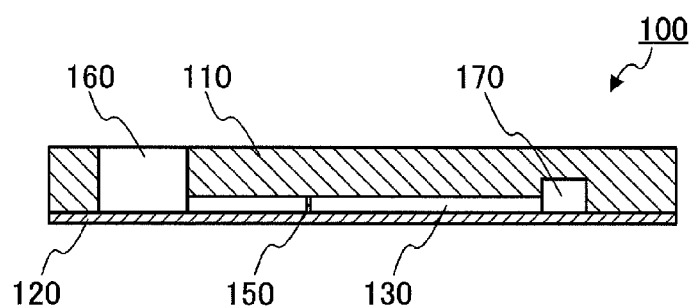
FIG. 1A
FIG. 1C
FIG. 1B

FLUID HANDLING DEVICE, FLUID HANDLING METHOD, AND FLUID HANDLING SYSTEM

TECHNICAL FIELD

The present invention relates to a fluid handling device and a fluid handling method which are used for analysis, processing, or the like of a liquid sample, and a fluid handling system having the fluid handling device.

BACKGROUND ART

In recent years, in order to perform analysis of trace amounts of substances such as proteins or nucleic acids with high accuracy and at high speed, microchannel chips have been used. The microchannel chips have an advantage of requiring smaller amounts of reagents and samples and thus are expected to be used in various applications including clinical inspection, food inspection, and environmental inspection.

In order to automate processing using the microchannel chip, providing a valve structure in the microchannel chip is proposed (refer to NPLs 1 and 2, for example).

NPLs 1 and 2 disclose microchannel chips which include passive valves for stopping liquid flow in a channel by using the surface tension of the liquid. In these microchannel chips, the cross-sectional area of the channel is rapidly increased at a site where it is desirable to stop the liquid flow. By doing so, it is possible to stop the flow of liquid in a channel by using the surface tension of the liquid, at a site where the cross-sectional area of the channel is rapidly increased.

CITATION LIST

Non-Patent Literature

NPL 1
Gorkin R., et al., "Centrifugal microfluidics for biomedical applications", Lab on a Chip, Vol. 10, pp. 1758-1773.
NPL 2
Melin J., et al., "A liquid-triggered liquid microvalve", TRANSDUCERS 2003—The 12th International Conference on Solid-State Sensors, Actuators and Microsystems, pp. 1562-1565.

SUMMARY OF INVENTION

Technical Problem

However, the microchannel chip which includes the passive valve in the related art has the disadvantage of complicated operation to open the valve.

In the microchannel chip described in NPL 1, in order to allow the previously stopped liquid to flow again, it is necessary to apply a centrifugal force that acts thereon. In order to generate a centrifugal force that acts on the liquid in a channel in this manner, a large-scale apparatus capable of rotating the microchannel chip is required.

In the microchannel chip disclosed in NPL 2, in order to allow the previously stopped liquid to flow again, it is necessary to introduce another liquid from another channel. When another liquid is introduced in this manner, there is a concern that the composition of liquid in the channel may change. Further, since the opening speed of the valve depends on the speed of capillary action of liquid, there is a concern that the opening of the valve at an appropriate timing may fail.

An object of the present invention is to provide a fluid handling device and a fluid handling method thus allow for easy control of the fluid flow in a channel without installing a large-scale apparatus outside. Another object of the present invention is to provide a fluid handling system having the fluid handling device.

Solution to Problem

A fluid handling device according to the invention adopts a configuration in which the fluid handling device includes: a first channel which has a first end and a second end and in which a fluid may move by capillary action; an air reservoir connected to the second end; an air discharge port which communicates with the outside; a second channel which communicates with the air discharge port; and a communication section which allows the first channel and the second channel to communicate with each other and has a cross-sectional area smaller than a cross-sectional area of the second channel, in which the air reservoir is formed such that a through-hole which allows the air reservoir and the outside to communicate with each other can be formed in the air reservoir.

A fluid handling method according to the invention is a method of handling a fluid by using the fluid handling device described above and includes: a step of introducing a fluid from the first end into an area between the first end and a connection section of the communication section with the first channel, in the first channel; a step of forming a through-hole which allows the air reservoir and the outside to communicate with each other; and a step of moving the fluid in the first channel to the second end side by capillary action.

A fluid handling system according to the invention includes: the fluid handling device described above; and a valve opening section that forms a through-hole which allows the air reservoir and the outside to communicate with each other.

Advantageous Effects of Invention

According to the invention, it is possible to easily control the flow of a fluid in a channel of a fluid handling device without installing a large-scale apparatus outside.

BRIEF DESCRIPTION OF DRAWINGS

FIG. 1A is a plan view of a microchannel chip according to Embodiment 1, FIG. 1B is a cross-sectional view of the microchannel chip taken along line B-B shown in FIG. 1A, and FIG. 1C is a cross-sectional view of the microchannel chip taken along line C-C shown in FIG. 1A;

DESCRIPTION OF EMBODIMENTS

Hereinafter, embodiments of the present invention will be described in detail with reference to the drawings. In the following description, as a representative example of a fluid handling device according to the invention, a microchannel chip will be described.

As used herein, "film" means a thin flat plate-shaped member, and, for example, "resin film" includes a resin thin plate in addition to a resin thin film.

Embodiment 1

In Embodiment 1, microchannel chip 100 according to an embodiment of the present invention and fluid handling system 300 having microchannel chip 100 will be described.

[Configuration of Microchannel Chip]

FIGS. 1A to 1C are diagrams showing the configuration of microchannel chip 100 according to Embodiment 1. FIG. 1A is a plan view of microchannel chip 100, FIG. 1B is a cross-sectional view of microchannel chip 100 taken along line B-B shown in FIG. 1A, and FIG. 1C is a cross-sectional view of microchannel chip 100 taken along line C-C shown in FIG. 1A.

Figures 2A, 2C:
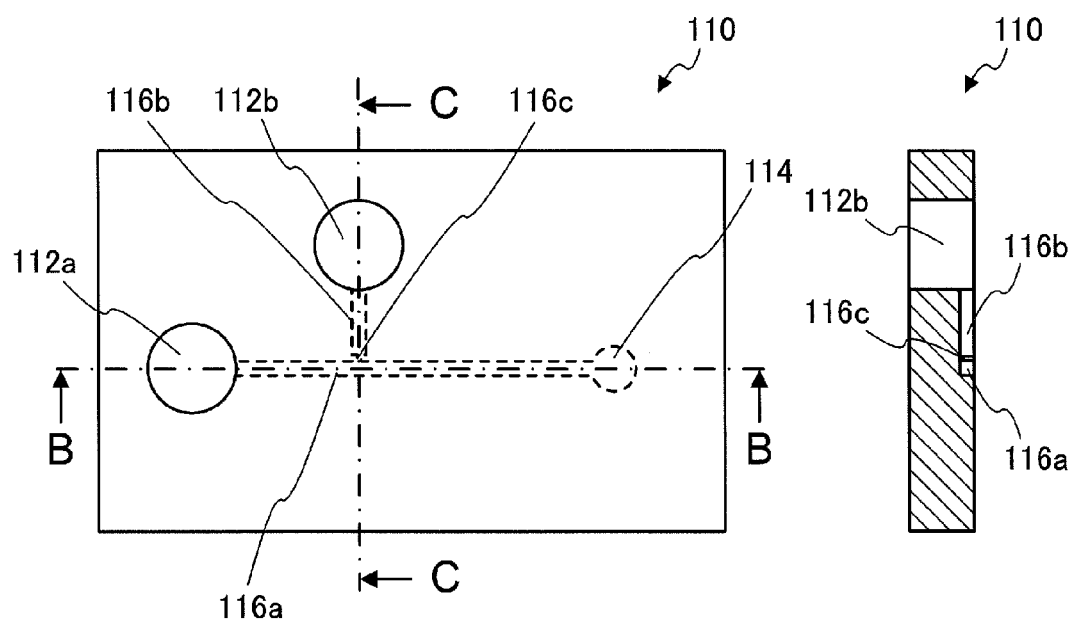
FIG. 2A is a plan view of a chip main body.
FIG. 2C is a cross-sectional view of the chip main body taken along line C-C shown in FIG. 2A.
Figure 2B:
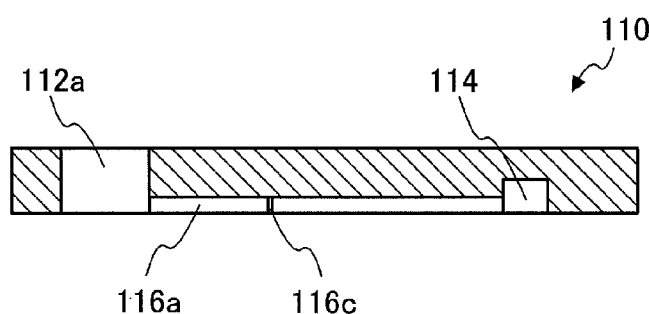
FIG. 2B is a cross-sectional view of the chip main body taken along line B-B shown in FIG. 2A.

FIGS. 2A to 2C are diagrams showing the configuration of chip main body 110 of microchannel chip 100. FIG. 2A is a plan view of chip main body 110, FIG. 2B is a cross-sectional view of chip main body 110 taken along line B-B shown in FIG. 2A, and FIG. 2C is a cross-sectional view of chip main body 110 taken along line C-C shown in FIG. 2A.

Figure 3A:
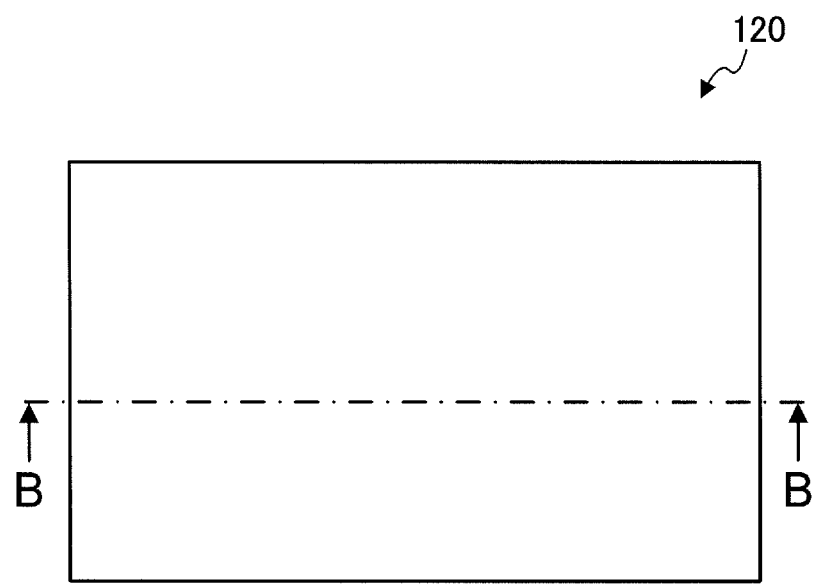
FIG. 3A is a plan view of a resin film.
Figure 3B:
FIG. 3B is a cross-sectional view of the resin film taken along line B-B shown in FIG. 3A.

FIGS. 3A and 3B are diagrams showing the configuration of resin film 120 of microchannel chip 100. FIG. 3A is a plan view of resin film 120, and FIG. 3B is a cross-sectional view of resin film 120 taken along line B-B shown in FIG. 3A.

Figure 4:
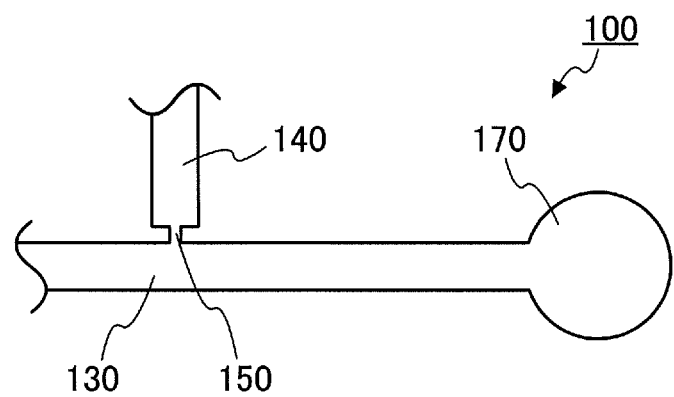
FIG. 4 is a partially enlarged plan view of the microchannel chip according to Embodiment 1.

FIG. 4 is a partially enlarged plan view of microchannel chip 100.

As shown in FIGS. 1A to 1C, microchannel chip 100 is a plate-shaped device having two bottomed recesses (liquid introduction port 160 and air discharge port 180) and a single hermetically-sealed space (air reservoir 170). Liquid introduction port 160 and air reservoir 170 communicate with each other through first channel 130. Liquid introduction port 160 is formed at a first end of first channel 130, and air reservoir 170 is formed at a second end of first channel 130. Air discharge port 180 communicates with first channel 130 through second channel 140 and communication section 150. As will be described later, air reservoir 170 is formed such that a through-hole which allows air reservoir 170 and the outside to communicate with each other can be formed therein.

As shown in FIGS. 1A to 1C, microchannel chip 100 has chip main body (substrate) 110 and resin film 120.

Chip main body 110 is a substantially rectangular transparent resin substrate. Two through-holes 112a and 112b and single bottomed recess 114 are formed in chip main body 110 (refer to FIGS. 2A to 2C). Openings on one side of two through-holes 112a and 112b are blocked by resin film 120, whereby through-holes 112a and 112b respectively become the bottomed recesses (liquid introduction port 160 and air discharge port 180) (refer to FIGS. 1B and 1C). Further, an opening of recess 114 is blocked by resin film 120, whereby recess 114 becomes the hermetically-sealed space (air reservoir 170) (refer to FIG. 1B).

The shape of through-holes 112a and 112b and recess 114 is not particularly limited. However, the shape is, for example, a substantially columnar shape. The thickness of chip main body 110 is not particularly limited. However, the thickness is, for example, in a range of 1 mm to 10 mm. Further, the diameter of each of through-holes 112a and 112b and recess 114 is not particularly limited. However, the diameter is, for example, about 2 mm.

Groove 116a connecting through-hole 112a and recess 114 is formed in the surface on the resin film 120 side of chip main body 110. An opening of groove 116a is blocked by resin film 120, whereby groove 116a becomes first channel 130 connecting liquid introduction port 160 and air reservoir 170 (refer to FIG. 1B).

Further, grooves 116b and 116c connecting through-hole 112b and groove 116a are also formed in the surface on the resin film 120 side of chip main body 110. Openings of grooves 116b and 116c are blocked by resin film 120, whereby grooves 116b and 116c become channels (second channel 140 and communication section 150) connecting air discharge port 180 and first channel 130 (refer to FIG. 1C).

The type of resin configuring chip main body 110 is not particularly limited and can be appropriately chosen from known resins. Examples of the resin configuring chip main body 110 include polyethylene terephthalate, polycarbonate, polymethylmethacrylate, vinyl chloride, polypropylene, polyether, polyethylene.

Resin film 120 is a substantially rectangular transparent resin film joined to the surface on one side of chip main body 110 (refer to FIGS. 3A and 3B). For example, resin film 120 is joined to chip main body 110 by thermocompression bonding. As described above, resin film 120 blocks the openings of through-holes 112a and 112b, recess 114, and grooves 116a to 116c formed in chip main body 110.

The thickness of resin film 120 is not particularly limited. However, a thickness is preferable in which a through-hole can be formed in a site blocking the opening of recess 114 (a site configuring a wall surface of air reservoir 170) so that air reservoir 170 and the outside communicate with each other. By doing so, it is possible to form the through-hole which allows air reservoir 170 and the outside to communicate with each other, at any intended timing (timing to open a microvalve). For example, the thickness of resin film 120 is about 100 µm.

The type of resin configuring resin film 120 is not particularly limited and can be appropriately chosen from known resins. An example of the resin configuring resin film 120 is the same as an example of the resin configuring chip main body 110. From the perspective of improving adhesion between chip main body 110 and resin film 120, it is preferable that the resin configuring resin film 120 be the same as the resin configuring chip main body 110.

As shown in FIG. 4, first channel 130 and second channel 140 communicates with each other through communication section 150. Both first channel 130 and communication section 150 are tubes in which a fluid (liquid) can move by capillary action. The cross-sectional area and the cross-sectional shape of first channel 130 are not particularly limited as long as liquid can move inside thereof by capillary action. For example, the cross-sectional shape of first channel 130 is a substantially rectangular shape in which the dimension (width or depth) of one side is on the order of several tens of µm. As used herein, "cross section of a channel" means the cross section of a channel orthogonal to a direction in which a fluid (liquid or gas) flows.

In contrast, the cross-sectional area of communication section 150 is sufficiently smaller than the cross-sectional area of second channel 140. More specifically, the cross-sectional area of communication section 150 is made smaller than the cross-sectional area of second channel 140 such that the cross-sectional area of a channel rapidly changes at a connection section of communication section 150 with second channel 140. By doing so, it becomes impossible for liquid in communication section 150 to enter second channel 140 by its own surface tension. That is, the connection section of communication section 150 with second channel 140 functions as a valve. For example, the cross-sectional shape of second channel 140 is a substantially rectangular shape in which the dimension (width or depth) of one side is on the order of several tens of µm, and the cross-sectional shape of communication section 150 is a substantially rectangular shape in which the dimension (width or depth) of one side is about 30 µm.

Further, as shown in FIG. 4, air reservoir 170 is a hermetically-sealed space which communicates with only first channel 130. As used herein, "hermetically-sealed space" means a space which does not directly communicate with the outside. Therefore, air in first channel 130 can be discharged from air discharge port 180 to the outside but is not discharged from air reservoir 170 to the outside.

In resin film 120 which is positioned between air reservoir 170 and the outside, a through-hole which allows air reservoir 170 to communicate with the outside can be formed. When the through-hole is formed in resin film 120, air in first channel 130 can be discharged from not only air discharge port 180, but also air reservoir 170 to the outside.

Microchannel chip 100 according to the present embodiment can be manufactured, for example, by joining chip main body 110 shown in FIGS. 2A to 2C and resin film 120 shown in FIGS. 3A and 3B to each other.

[How to Use Microchannel Chip]

Figure 5A:
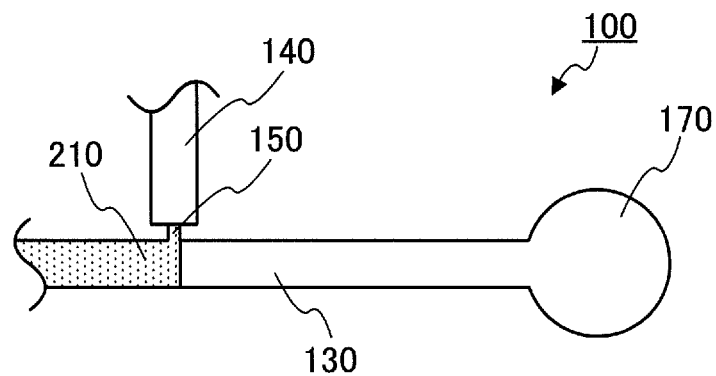
FIGS. 5A and 5B are partially enlarged plan views of the microchannel chip according to Embodiment 1 for describing how to use the microchannel chip according to Embodiment 1.
Figure 5B:
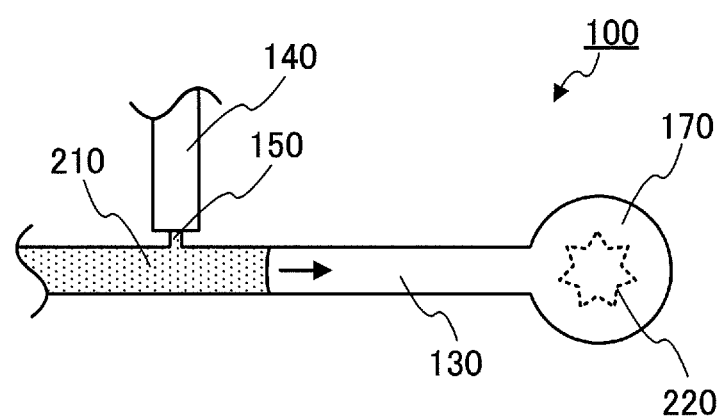

Next, how to use microchannel chip 100 according to the present embodiment will be described with reference to FIGS. 5A and 5B. FIGS. 5A and 5B are partially enlarged plan views of microchannel chip 100 for describing how microchannel chip 100 is used.

First, as shown in FIG. 5A, liquid 210 such as a reagent or a liquid sample is introduced into first channel 130 by providing liquid 210 into liquid introduction port 160. Liquid 210 in liquid introduction port 160 advances in first channel 130 toward the second end (air reservoir 170) side from the first end (liquid introduction port 160) side by capillary action and reaches the connection section of first channel 130 with communication section 150. As described above, air in first channel 130 can be discharged from air discharge port 180 to the outside but is not discharged from air reservoir 170 to the outside. Therefore, liquid 210 can advance in communication section 150 but cannot advance in first channel 130 toward the second end (air reservoir 170) any more. Further, since the connection section of communication section 150 with second channel 140 functions as a valve, liquid 210 cannot advance into second channel 140.

Thus, by providing liquid 210 into liquid introduction port 160, it is possible to introduce liquid 210 into only an area between the first end (liquid introduction port 160) and the connection section of first channel 130 with communication section 150, in first channel 130 (a valve close state).

Subsequently, as shown in FIG. 5B, air in first channel 130 can be also discharged from air reservoir 170 by forming through-hole 220 in resin film 120 which is positioned between air reservoir 170 and the outside. As a result, liquid 210 in first channel 130 moves to the second end (air reservoir 170) side by capillary action (a valve open state).

Figure 6:
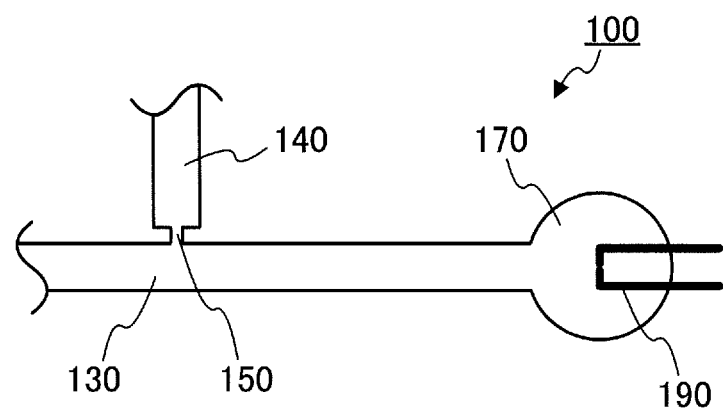
FIG. 6 is a partially enlarged plan view showing another example of the microchannel chip according to Embodiment 1.

A method of forming through-hole 220 in resin film 120 is not particularly limited. For example, by piercing resin film 120 with a needle, irradiating resin film 120 with a laser light, or heating resin film 120, it is possible to form through-hole 220 in resin film 120. In a case of forming through-hole 220 by heating resin film 120, heating section 190 may be formed on resin film 120, as shown in FIG. 6. Heating section 190 may be formed on the surface on the air reservoir 170 side of resin film 120 and may also be formed on the surface on the external side. In any case, by applying an electric current to heating section 190, it is possible to form through-hole 220 in resin film 120.

By the above procedure, it is possible to realize stopping liquid 210 in a portion of first channel 130 and communication section 150 and moving liquid 210 in first channel 130 in an air reservoir 170 direction at any intended timing.

[Effects]

In microchannel chip 100 according to the present embodiment, it is possible to stop liquid 210 in a portion (a portion between liquid introduction port 160 and the connection section of first channel 130 with communication section 150) of first channel 130 by the surface tension of liquid 210. Further, in microchannel chip 100 according to the present embodiment, by forming through-hole 220 in resin film 120 which is positioned between air reservoir 170 and the outside, it is possible to move liquid 210 in first channel 130 in an air reservoir 170 direction. In this manner, in microchannel chip 100 according to the present embodiment, it is possible to easily control the flow of liquid in a channel without installing a large-scale apparatus outside.

In addition, in the description so far, microchannel chip 100 has been described in which each of air discharge port 180, communication section 150, and air reservoir 170 is formed singly. However, the number of air discharge ports 180, communication sections 150, and air reservoirs 170 in microchannel chip 100 is not limited to one. That is, a plurality of microvalve structures may be formed in microchannel chip 100.

[Configuration of Fluid Handling System]

Next, fluid handling system 300 having microchannel chip 100 described above will be described.

Figure 7:
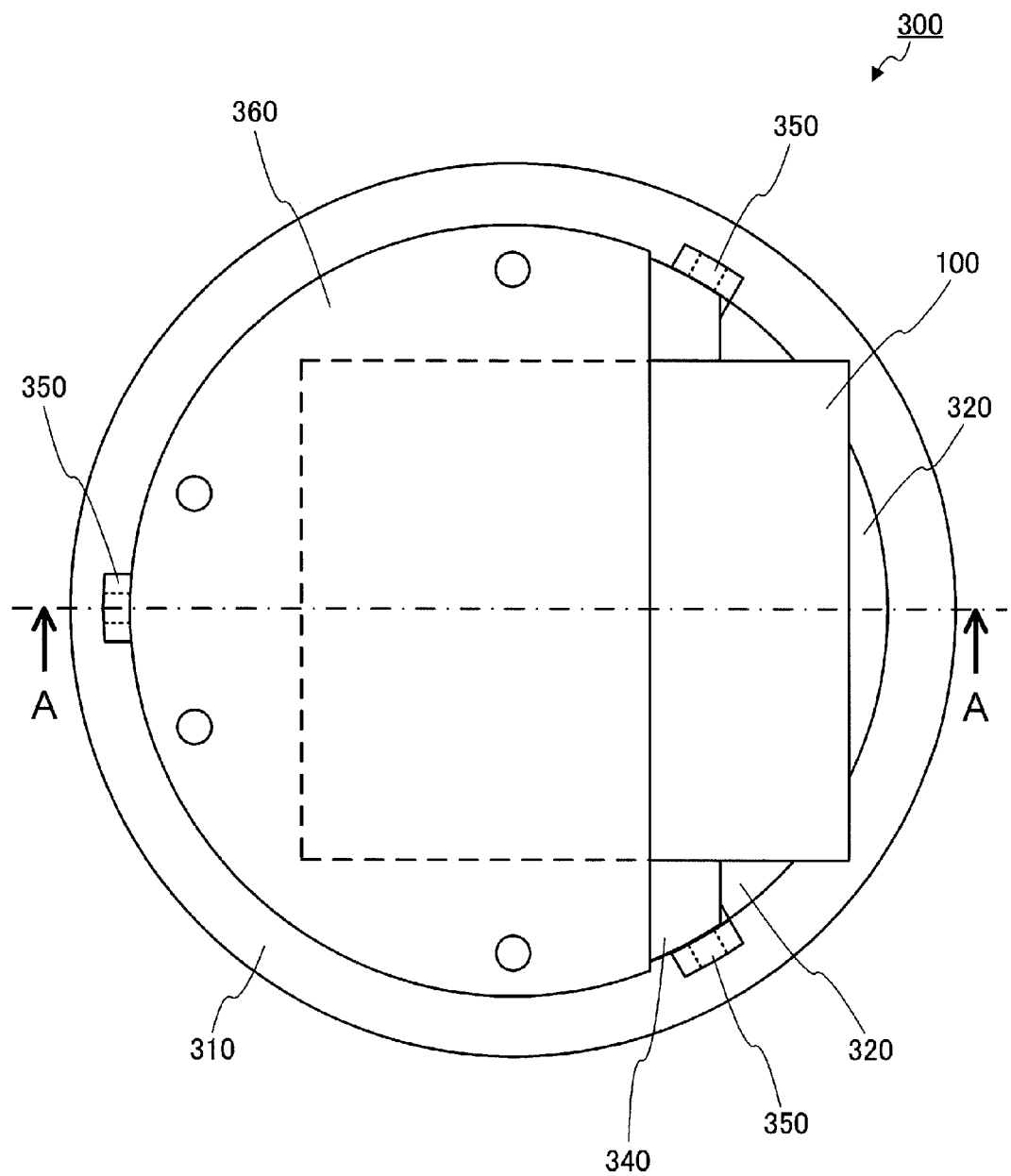
FIG. 7 is a plan view showing the configuration of a fluid handling system.
Figure 8:
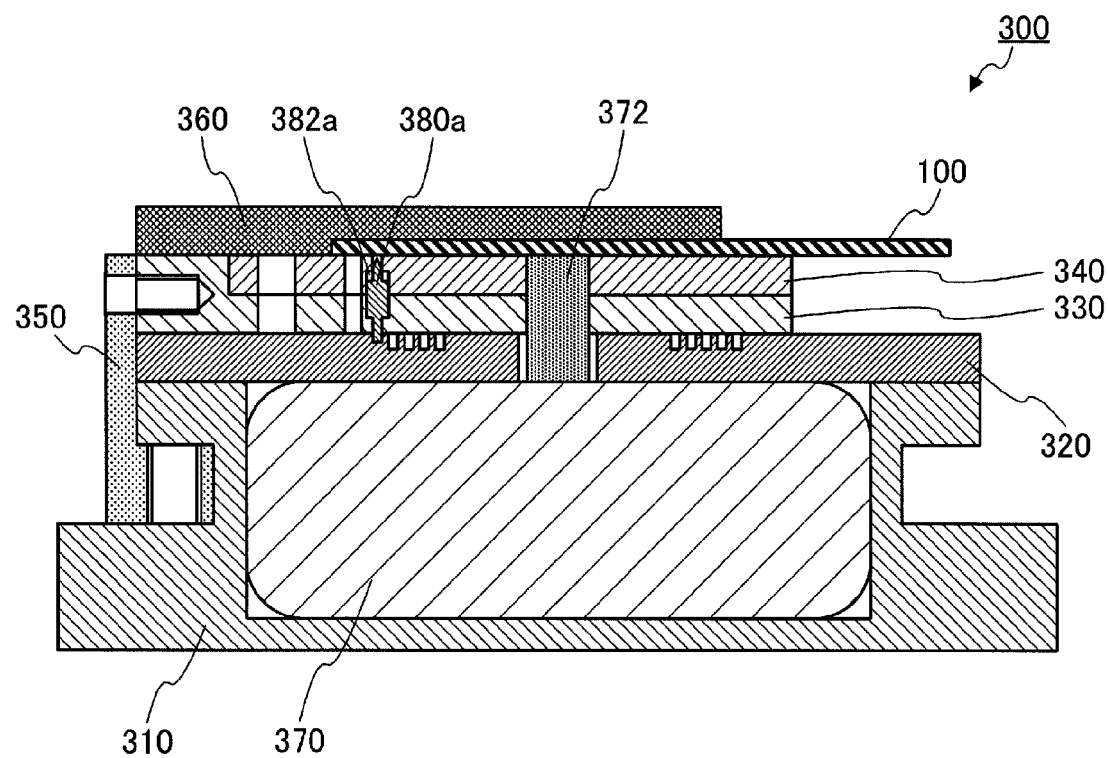
FIG. 8 is a cross-sectional view showing the configuration of the fluid handling system.

FIG. 7 is a plan view showing the configuration of fluid handling system 300 according to the present embodiment. Further, FIG. 8 is a cross-sectional view of fluid handling system 300 taken along line A-A shown in FIG. 7. The outer diameter of fluid handling system 300 in a plan view is, for example, in a range of 60 mm to 70 mm.

Figure 9A:
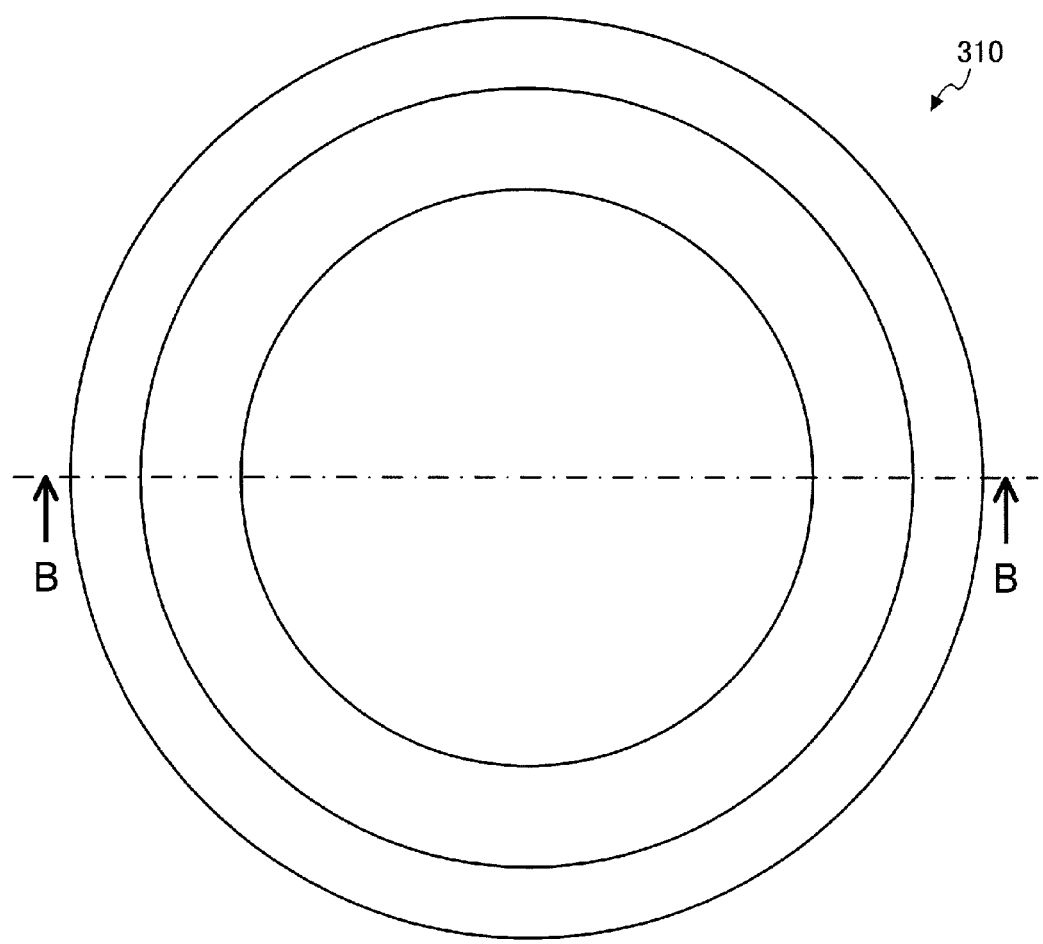
FIG. 9A is a plan view of a driving section holder.
Figure 9B:
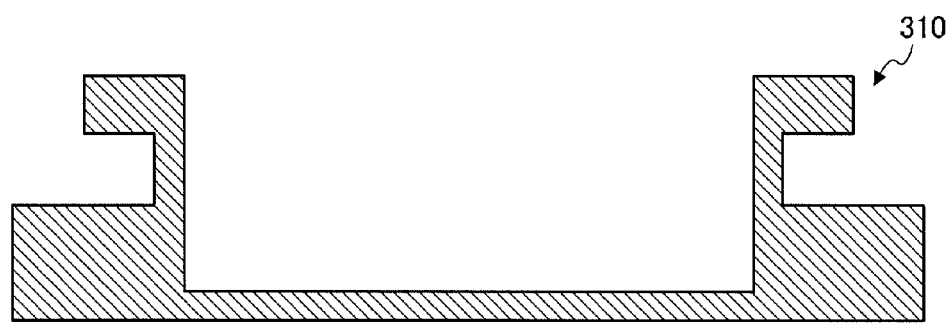
FIG. 9B is a cross-sectional view of the driving section holder taken along line B-B shown in FIG. 9A.

FIGS. 9A and 9B are diagrams showing the configuration of driving section holder 310 of fluid handling system 300. FIG. 9A is a plan view of driving section holder 310, and FIG. 9B is a cross-sectional view of driving section holder 310 taken along line B-B shown in FIG. 9A.

Figure 10A:
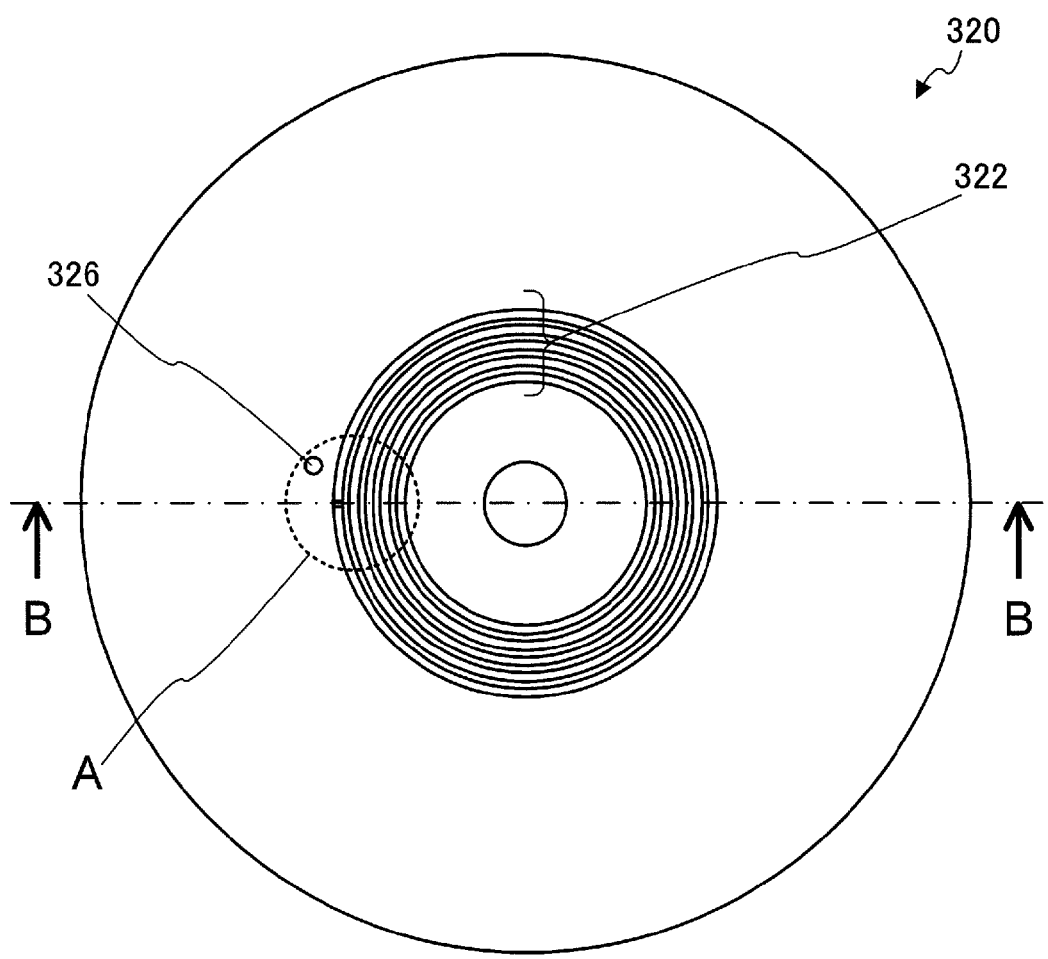
FIG. 10A is a plan view of a coded plate.
Figure 10B:
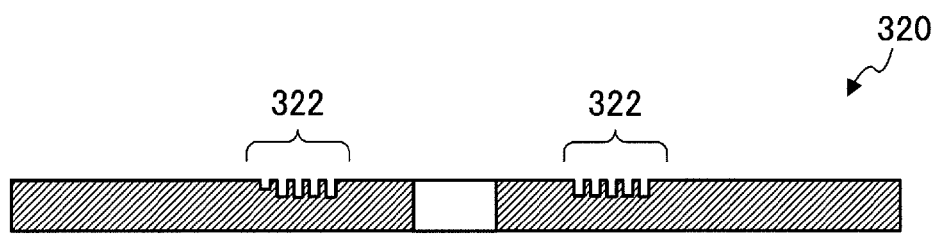
FIG. 10B is a cross-sectional view of the coded plate taken along line B-B shown in FIG. 10A.
Figure 11D:
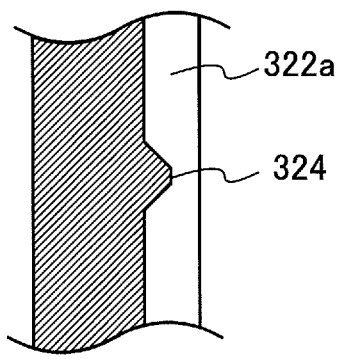
FIG. 11D is a cross-sectional view of the area A taken along line D-D shown in FIG. 11A.
Figure 11A:
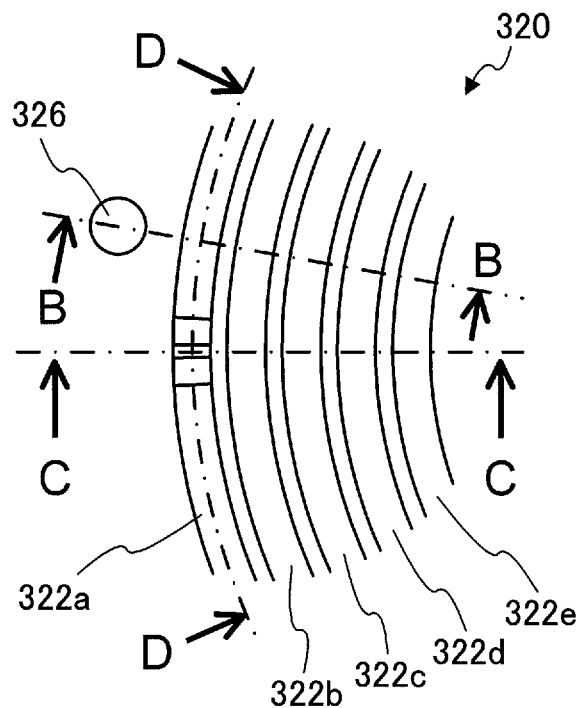
FIG. 11A is an enlarged plan view of an area A shown by a dashed line in FIG. 10A.
Figure 11B:
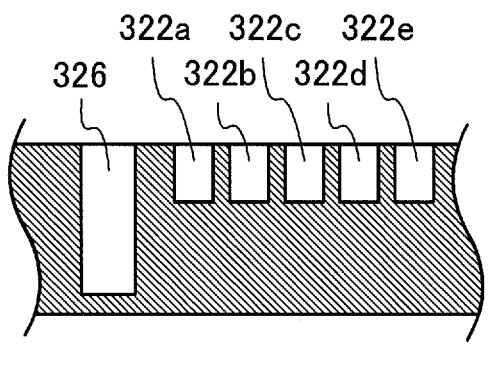
FIG. 11B is a cross-sectional view of the area A taken along line B-B shown in FIG. 11A.
Figure 11C:
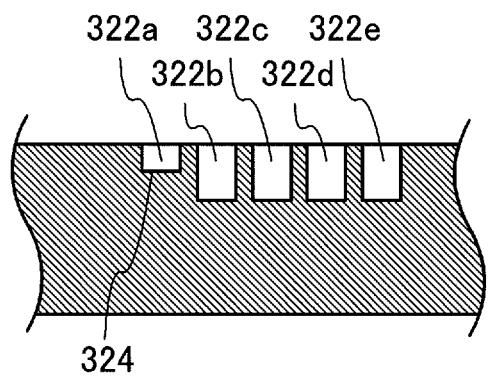
FIG. 11C is a cross-sectional view of the area A taken along line C-C shown in FIG. 11A.

FIGS. 10A, 10B, and 11A to 11D are diagrams showing the configuration of coded plate 320 of fluid handling system 300. FIG. 10A is a plan view of coded plate 320, and FIG. 10B is a cross-sectional view of coded plate 320 taken along line B-B shown in FIG. 10A. FIG. 11A is an enlarged plan view of area A shown by a dashed line in FIG. 10A, FIG. 11B is a cross-sectional view of area A taken along line B-B shown in FIG. 11A, FIG. 11C is a cross-sectional view of area A taken along line C-C shown in FIG. 11A, and FIG. 11D is a cross-sectional view of area A taken along line D-D shown in FIG. 11A.

Figure 12A:
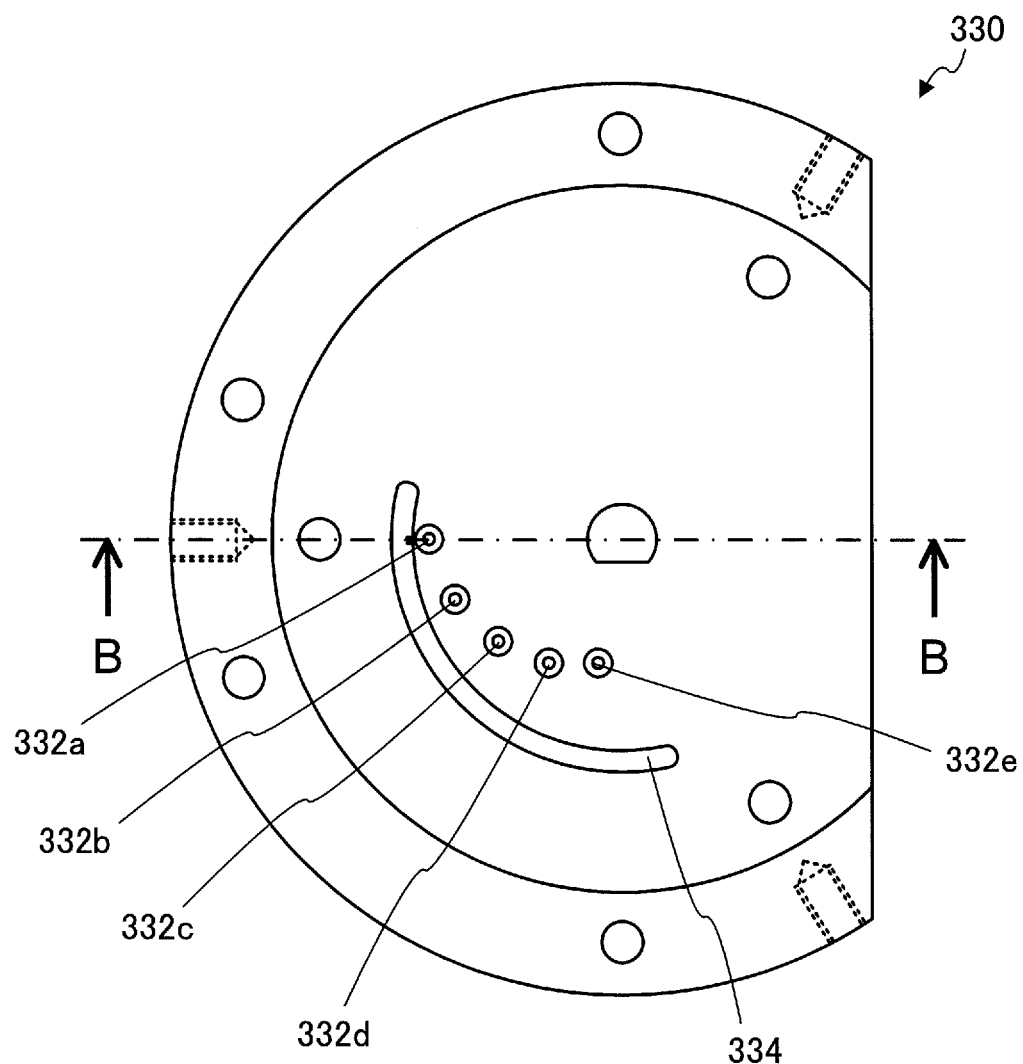
FIG. 12A is a plan view of a first pin holder.
Figure 12B:
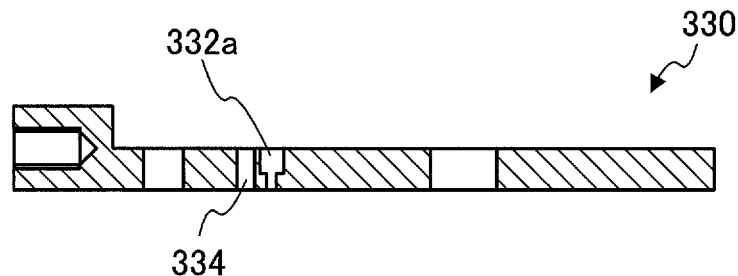
FIG. 12B is a cross-sectional view of the first pin holder taken along line B-B shown in FIG. 12A.

FIGS. 12A and 12B are diagrams showing the configuration of first pin holder 330 of fluid handling system 300. FIG. 12A is a plan view of first pin holder 330, and FIG. 12B is a cross-sectional view of first pin holder 330 taken along line B-B shown in FIG. 12A.

Figure 13A:
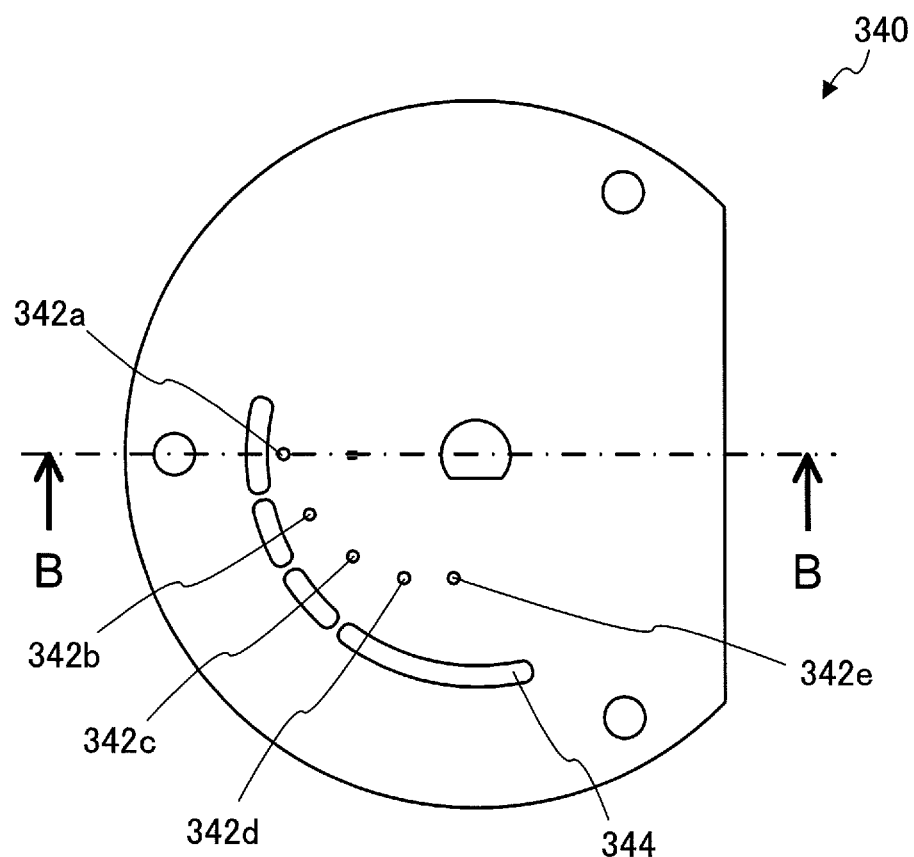
FIG. 13A is a plan view of a second pin holder.
Figure 13B:
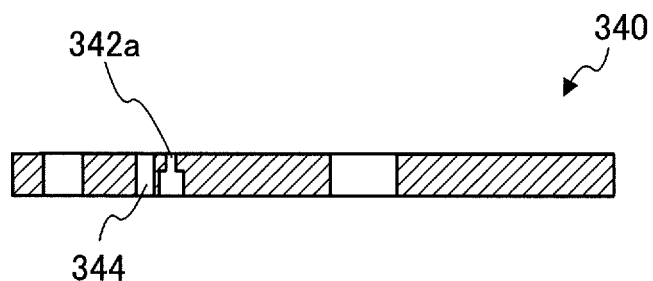
FIG. 13B is a cross-sectional view of the second pin holder taken along line B-B shown in FIG. 13A.

FIGS. 13A and 13B are diagrams showing the configuration of second pin holder 340 of fluid handling system 300. FIG. 13A is a plan view of second pin holder 340, and FIG. 13B is a cross-sectional view of second pin holder 340 taken along line B-B shown in FIG. 13A.

Figure 14A:
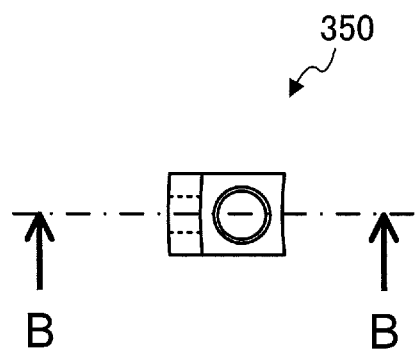
FIG. 14A is a plan view of a third pin holder.
Figure 14B:
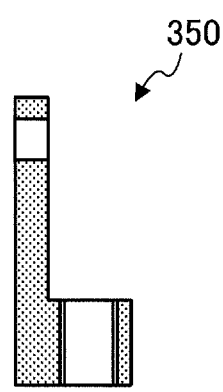
FIG. 14B is a cross-sectional view of the third pin holder taken along line B-B shown in FIG. 14A.

FIGS. 14A and 14B are diagrams showing the configuration of third pin holder 350 of fluid handling system 300. FIG. 14A is a plan view of third pin holder 350, and FIG. 14B is a cross-sectional view of third pin holder 350 taken along line B-B shown in FIG. 14A.

Figure 15A:
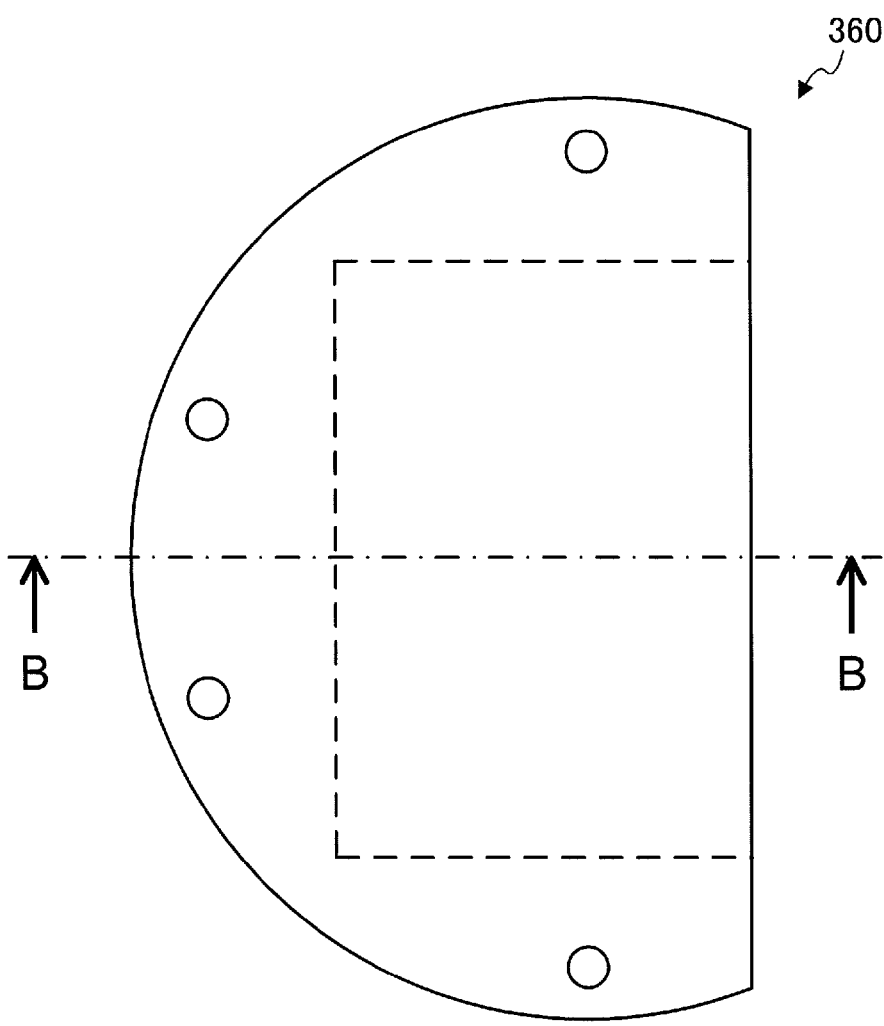
FIG. 15A is a plan view of a chip holder.
Figure 15B:
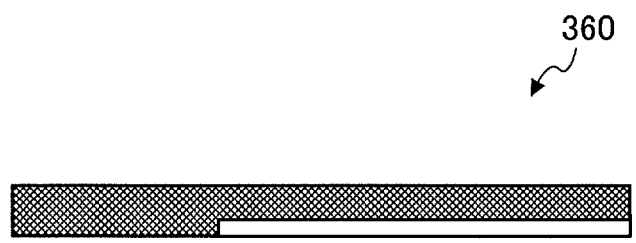
FIG. 15B is a cross-sectional view of the chip holder taken along line B-B shown in FIG. 15A.

FIGS. 15A and 15B are diagrams showing the configuration of chip holder 360 of fluid handling system 300. FIG. 15A is a plan view of chip holder 360, and FIG. 15B is a cross-sectional view of chip holder 360 taken along line B-B shown in FIG. 15A.

As shown in FIGS. 7 and 8, fluid handling system 300 according to the present embodiment has driving section holder 310, coded plate 320, first pin holder 330, second pin holder 340, third pin holder 350, chip holder 360, driving section 370, and a plurality of pins 380a to 380e (however, pins 380b to 380e are not shown). Fluid handling system 300 is used with microchannel chip 100 being inserted in a recess formed in chip holder 360.

Driving section holder 310 is a support member which supports driving section 370 and other members (refer to FIG. 8). A recess for installing driving section 370 is formed in a central portion of driving section holder 310. Further, a groove into which a protrusion of third pin holder 350 is fitted is formed in an outer peripheral portion of driving section holder 310 (refer to FIG. 9B).

Driving section 370 is disposed in the recess of driving section holder 310. Driving section 370 rotates rotating shaft 372 at a predetermined speed, thereby operating fluid handling system 300. As will be described later, first pin holder 330 and second pin holder 340 are fixed to rotating shaft 372. When rotating shaft 372 of driving section 370 rotates, first pin holder 330, second pin holder 340, third pin holder 350, chip holder 360, the plurality of pins 380a to 380e, and microchannel chip 100 rotate in an integrated manner. For example, driving section 370 is an electric motor (motor), a flat spiral spring, or the like.

Coded plate 320 is disposed on driving section holder 310 and fixed by third pin holder 350. Coded plate 320 is not fixed to rotating shaft 372, and thus even when rotating shaft 372 rotates, coded plate 320 does not rotate.

Five circumferential grooves 322a to 322e are formed in the surface of coded plate 320 (refer to FIGS. 10A and 10B). All the centers of circumferential grooves 322a to 322e coincide with the center of rotating shaft 372.

Protrusions 324 are formed in grooves 322a to 322e (refer to FIGS. 11A to 11D). As will be described later, protrusions 324 define the operation contents of fluid handling system 300. That is, information defining the operation contents of fluid handling system 300 is written in grooves 322a to 322e of coded plate 320.

First pin holder 330 and second pin holder 340 are disposed on coded plate 320. On the other hand, third pin holder 350 is disposed on the side surfaces of coded plate 320, first pin holder 330, and second pin holder 340. First pin holder 330, second pin holder 340, and third pin holder 350 are fixed to each other by screws (not shown). Further, first pin holder 330 and second pin holder 340 that are fixed to each other are fixed to rotating shaft 372. Therefore, when rotating shaft 372 rotates, first pin holder 330, second pin holder 340, and third pin holder 350 rotate in an integrated manner.

Through-holes 332a to 332e for accommodating pins 380a to 380e are formed in first pin holder 330 (refer to FIG. 12A). Similarly, through-holes 342a to 342e for accommodating pins 380a to 380e are also formed in second pin holder 340 (refer to FIG. 13A). When first pin holder 330 and second pin holder 340 are fixed to rotating shaft 372, through-hole 332a and through-hole 342a form a pin accommodation portion 382a together (refer to FIG. 8). Similarly, each of through-holes 332b to 332e and each of through-holes 342b to 342e also form each of pin accommodation portions 382b to 382e. Pin accommodation portions 382a to 382e which are formed in this way are respectively located directly above grooves 322a to 322e of coded plate 320.

Pins 380a to 380e are respectively accommodated in pin accommodation portions 382a to 382e (refer to FIG. 8). Lower ends of pins 380a to 380e respectively are in contact with the bottom surfaces of grooves 322a to 322e of coded plate 320. Further, each of upper ends of pins 380a to 380e faces resin film 120 (a portion configuring the wall surface of air reservoir 170) of microchannel chip 100. The shape of an upper end of each of pins 380a to 380e is a needle shape.

Chip holder 360 is fixed onto first pin holder 330 and second pin holder 340. A recess for inserting microchannel chip 100 is formed in the surface on the second pin holder 340 side of chip holder 360 (refer to FIGS. 15A and 15B).

[Operation of Fluid Handling System]

Figure 16A:
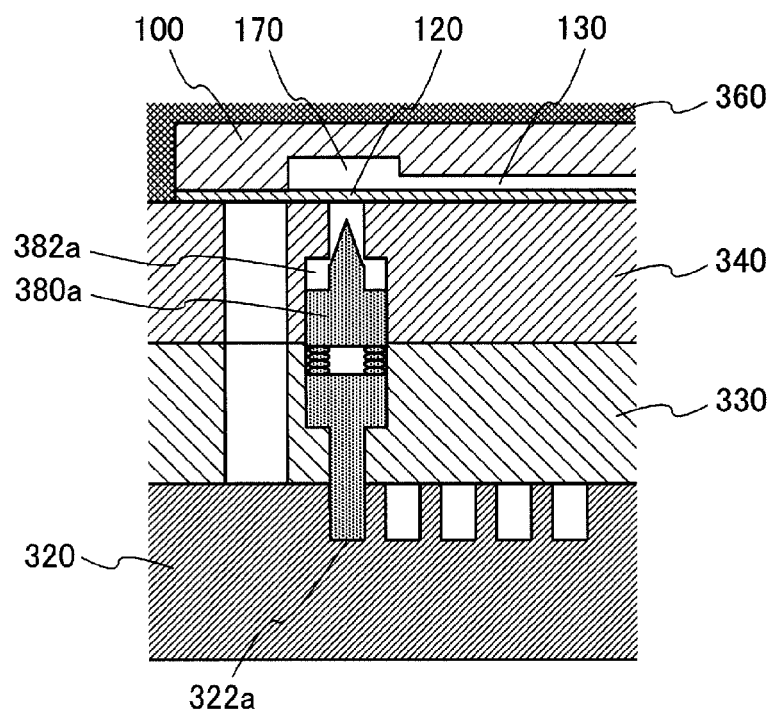
FIGS. 16A and 16B are partially enlarged cross-sectional views of the fluid handling system for describing an operation of the fluid handling system.
Figure 16B:
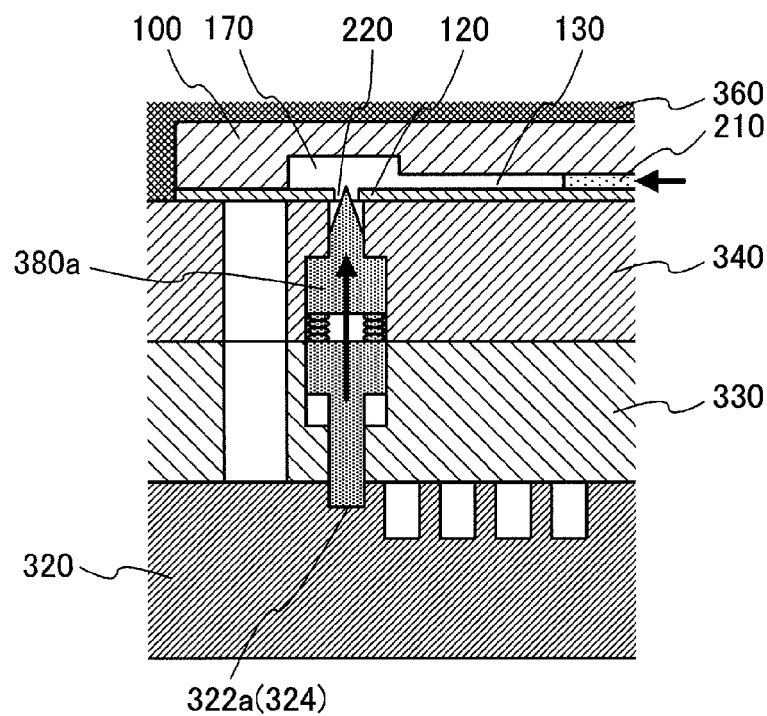

Next, an operation of fluid handling system 300 according to the present embodiment will be described with reference to FIGS. 16A and 16B. FIGS. 16A and 16B are partially enlarged cross-sectional views of fluid handling system 300 for describing an operation of fluid handling system 300.

When driving section 370 rotates rotating shaft 372 at a predetermined speed, first pin holder 330, second pin holder 340, third pin holder 350, chip holder 360, pins 380a to 380e, and microchannel chip 100 rotate in an integrated manner. On the other hand, coded plate 320 does not rotate. Therefore, pins 380a to 380e respectively move to follow grooves 322a to 322e of coded plate 320.

As shown in FIG. 16A, when each of grooves 322a to 322e has a normal depth, the upper ends of pins 380a to 380e do not come into contact with resin film 120 of microchannel chip 100. On the other hand, as shown in FIG. 16B, when the lower ends of pins 380a to 380e are placed on protrusions 324 in grooves 322a to 322e, the upper ends of pins 380a to 380e press resin film 120 of microchannel chip 100. In this way, through-hole 220 is formed in resin film 120, and thus liquid 210 in first channel 130 moves toward air reservoir 170 by capillary action.

As described above, in fluid handling system 300 according to the present embodiment, each of pins 380a to 380e automatically forms through-hole 220 in resin film 120 of microchannel chip 100 according to patterns of protrusions 324 formed in grooves 322a to 322e of coded plate 320. In this way, a microvalve of microchannel chip 100 (a microvalve which is configured by first channel 130, second channel 140, communication section 150, air reservoir 170, and air discharge port 180) is automatically opened according to patterns of protrusions 324 formed in grooves 322a to 322e of coded plate 320.

[Effects]

Fluid handling system 300 according to the present embodiment can automatically open the microvalve provided in microchannel chip 100 at any intended timing. Fluid handling system 300 according to the present embodiment can be easily reduced in size because it does not require a large-scale apparatus.

In addition, when heating section 190 is disposed in air reservoir 170 of microchannel chip 100 (refer to FIG. 6), fluid handling system 300 may open the microvalve of microchannel chip 100 by forming through-hole 220 in resin film 120 by applying an electric current to heating section 190. That is, a valve opening section which is provided in fluid handling system 300 may open the microvalve by pressing a pin against resin film 120 of microchannel chip 100 or may also open the microvalve by heating resin film 120.

Further, in the description so far, an example has been described in which pins 380a to 380e are operated by using protrusions 324 formed in grooves 322a to 322e of coded plate 320. However, a method of operating pins 380a to 380e is not limited thereto. For example, pins 380a to 380e may be operated by using a leaf spring, a solenoid actuator, a pneumatic cylinder, or the like.

Embodiment 2

Configuration of Microchannel Chip

Figure 17:
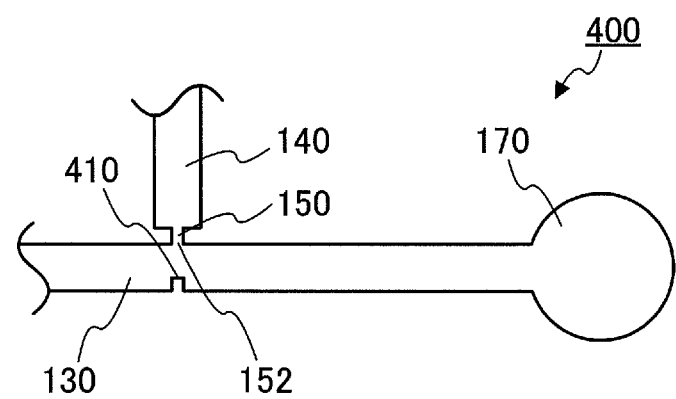
FIG. 17 is a partially enlarged plan view of a microchannel chip according to Embodiment 2.

FIG. 17 is a partially enlarged plan view (corresponding to FIG. 4) showing the configuration of microchannel chip 400 according to Embodiment 2 of the present invention. Microchannel chip 400 according to Embodiment 2 includes chip main body 110 and resin film 120, similar to microchannel chip 100 according to Embodiment 1 (refer to FIGS. 1A to 1C). In addition, the same constituent elements as those in microchannel chip 100 according to Embodiment 1 shown in FIGS. 1A to 4 are denoted by the same reference numerals and description thereof is omitted.

As shown in FIG. 17, microchannel chip 400 according to Embodiment 2 has first channel 130, second channel 140, communication section 150, liquid introduction port 160 (not shown), air reservoir 170, and air discharge port 180 (not shown). Microchannel chip 400 according to Embodiment 2 is different from microchannel chip 100 according to Embodiment 1 in that microchannel chip 400 has protrusion 410 in first channel 130.

Protrusion 410 is formed at a position opposite to opening 152 of communication section 150 in first channel 130. The size and the shape of protrusion 410 are not particularly limited as long as protrusion 410 does not block first channel 130.

[How to Use Microchannel Chip]

Figure 18A:
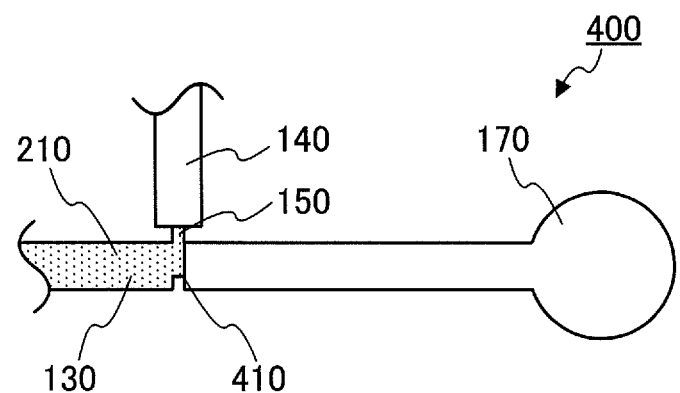
FIGS. 18A and 18B are partially enlarged plan views of the microchannel chip according to Embodiment 2 for describing how to use the microchannel chip according to Embodiment 2.
Figure 18B:
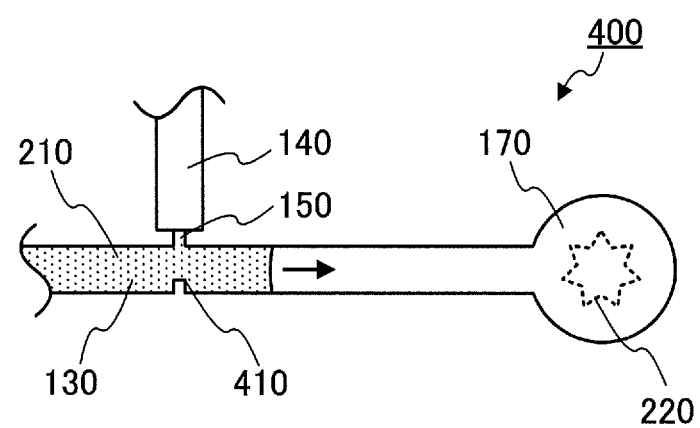

Next, how to use microchannel chip 400 will be described with reference to FIGS. 18A and 18B. FIGS. 18A and 18B are partially enlarged plan views of microchannel chip 400 for describing how microchannel chip 400 is used.

First, as shown in FIG. 18A, liquid 210 is introduced into first channel 130 by providing liquid 210 into liquid introduction port 160. In this way, similar to microchannel chip 100 according to Embodiment 1, it is possible to introduce liquid 210 only into an area between the first end (liquid introduction port 160) and the connection section of first channel 130 with communication section 150, in first channel 130 (a valve close state). At this time, since protrusion 410 is formed in first channel 130, it is possible to more reliably prevent liquid 210 from moving to the second end (air reservoir 170) side.

Subsequently, as shown in FIG. 18B, through-hole 220 is formed in resin film 120 which is positioned between air reservoir 170 and the outside. As a result, similar to microchannel chip 100 according to Embodiment 1, liquid 210 in first channel 130 moves to the second end (air reservoir 170) side by capillary action (a valve open state).

By the above procedure, similar to microchannel chip 100 according to Embodiment 1, it is possible to realize stopping liquid 210 in a portion of first channel 130 and communication section 150 and moving liquid 210 in first channel 130 in an air reservoir 170 direction at any intended timing.

[Effects]

Microchannel chip 400 according to the present embodiment can more reliably stop the flow of liquid 210 at the time of the valve close state, in addition to the effects of microchannel chip 100 according to Embodiment 1.

Embodiment 3

Configuration of Microchannel Chip

Figures 19A, 19B:
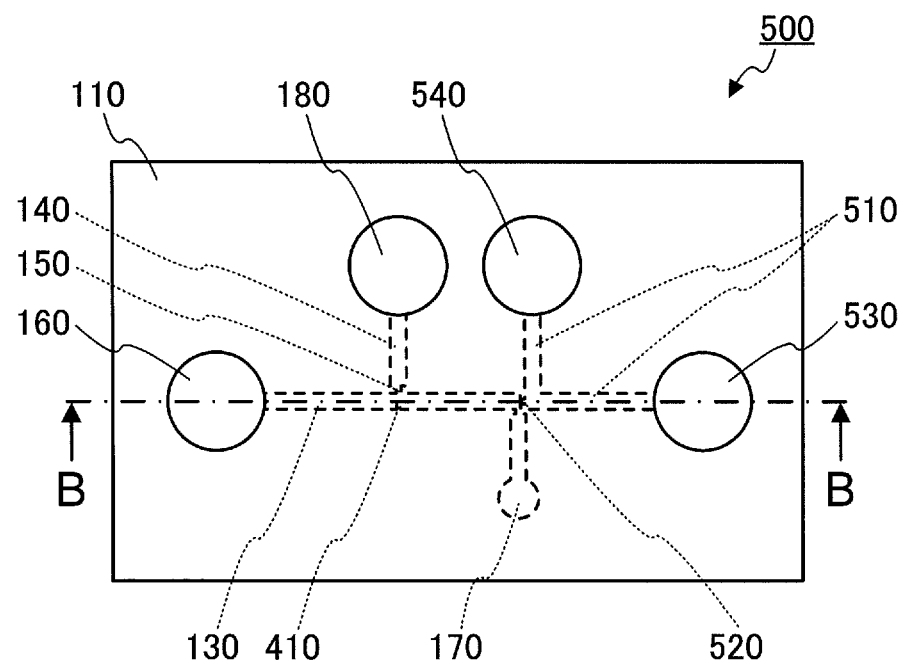
FIG. 19A is a plan view of a microchannel chip according to Embodiment 3.
FIG. 19B is a cross-sectional view of the microchannel chip taken along line B-B shown in FIG. 19A.
Figure 20:
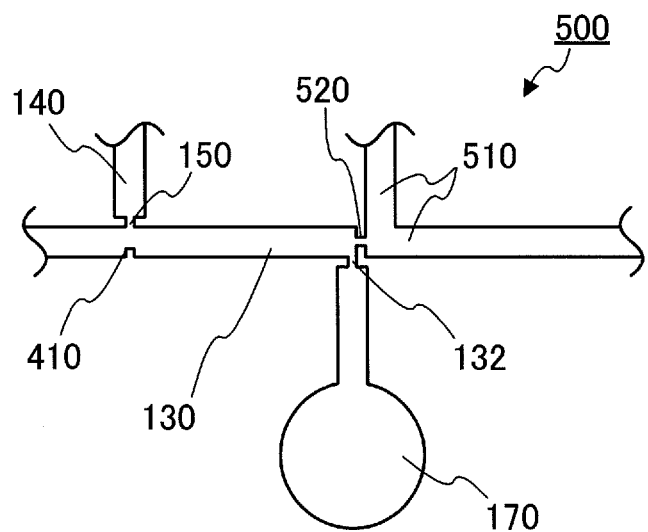
FIG. 20 is a partially enlarged plan view of the microchannel chip according to Embodiment 3.

FIGS. 19A, 19B, and 20 are diagrams showing the configuration of microchannel chip 500 according to Embodiment 3 of the present invention. FIG. 19A is a plan view of microchannel chip 500, and FIG. 19B is a cross-sectional view of microchannel chip 500 taken along line B-B shown in FIG. 19A. Further, FIG. 20 is a partially enlarged plan view of microchannel chip 500.

Microchannel chip 500 according to Embodiment 3 includes chip main body 110 and resin film 120, similar to microchannel chip 100 according to Embodiment 1 (refer to FIGS. 19A and 19B). In addition, the same constituent elements as those in microchannel chip 100 according to Embodiment 1 shown in FIGS. 1A to 4 and microchannel chip 400 according to Embodiment 2 shown in FIG. 17 are denoted by the same reference numerals and description thereof is omitted.

As shown in FIGS. 19A and 19B, microchannel chip 500 is a plate-shaped device having four bottomed recesses (first liquid introduction port 160, first air discharge port 180, second liquid introduction port 530, and second air discharge port 540) and a single hermetically-sealed space (air reservoir 170).

First liquid introduction port 160 and air reservoir 170 communicate with each other through first channel 130. First liquid introduction port 160 is formed at the first end of first channel 130, and air reservoir 170 is formed at the second end. First air discharge port 180 communicates with first channel 130 through second channel 140 and communication section 150.

Second liquid introduction port 530 and second air discharge port 540 communicate with each other through third channel 510. Second liquid introduction port 530 is formed at a first end of third channel 510, and second air discharge port 540 is formed at a second end.

As shown in FIG. 20, first channel 130 and third channel 510 communicate with each other through second communication section 520. In first channel 130, the position of a connection section with second communication section 520 is positioned between a connection section with first communication section 150 and air reservoir 170.

Third channel 510 is a tube in which a fluid (liquid) can move by capillary action. The cross-sectional area and the cross-sectional shape of third channel 510 is not particularly limited as long as liquid can move inside thereof by capillary action. For example, the cross-sectional shape of third channel 510 is a substantially rectangular shape in which the dimension (width or depth) of one side is on the order of several tens of μm.

The cross-sectional area of second communication section 520 is sufficiently smaller than the cross-sectional area of first channel 130. More specifically, the cross-sectional area of second communication section 520 is made smaller than the cross-sectional area of first channel 130 such that the cross-sectional area of a channel rapidly changes at a connection section of second communication section 520 with first channel 130. By doing so, it becomes impossible for liquid in second communication section 520 to enter first channel 130 by its own surface tension. The connection section of second communication section 520 with first channel 130 functions as a valve. For example, the cross-sectional shape of second communication section 520 is a substantially rectangular shape in which the dimension (width or depth) of one side is about 30 μm.

Further, as shown in FIG. 20, small-diameter portion 132 in which the cross-sectional area of first channel 130 is made small compared to the other portion is formed between the connection section of second communication section 520 in first channel 130 and air reservoir 170. Small-diameter portion 132 functions as a valve, similar to first communication section 150 and second communication section 520.

[How to Use Microchannel Chip]

Figure 21A:
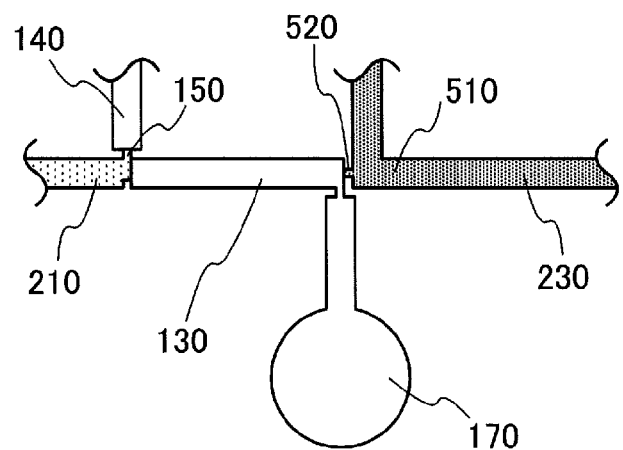
FIGS. 21A to 21C are partially enlarged plan views of the microchannel chip according to Embodiment 3 for describing how to use the microchannel chip according to Embodiment 3.
Figure 21B:
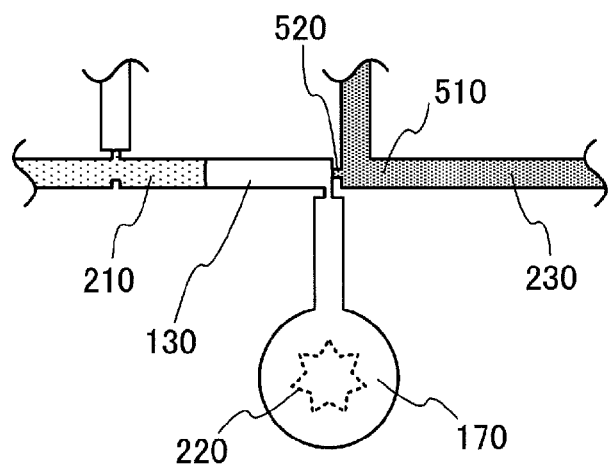
Figure 21C:
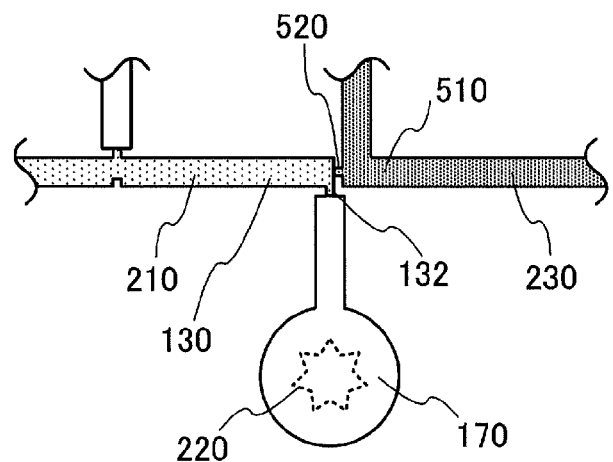

Next, how to use microchannel chip 500 according to the present embodiment will be described with reference to FIGS. 21A to 21C. FIGS. 21A to 21C are partially enlarged plan views of microchannel chip 500 for describing how microchannel chip 500 is used.

First, as shown in FIG. 21A, second liquid 230 is introduced into third channel 510 by providing second liquid 230 into second liquid introduction port 530. Subsequently, first liquid 210 is introduced into first channel 130 by providing first liquid 210 into first liquid introduction port 160.

Second liquid 230 in second liquid introduction port 530 advances in third channel 510 by capillary action and reaches second air discharge port 540. Further, second liquid 230 advances also in second communication section 520 by capillary action. However, since the connection section of second communication section 520 with first channel 130 functions as a valve, it is not possible for second liquid 230 to advance into first channel 130.

On the other hand, first liquid 210 in first liquid introduction port 160 advances in first channel 130 to the connection section of first channel 130 with first communication section 150 (a valve close state), as described in Embodiment 1. In addition, since second communication section 520 is filled with second liquid 230, air in first channel 130 is not discharged from second liquid introduction port 530 or second air discharge port 540 to the outside.

Subsequently, as shown in FIG. 21B, air in first channel 130 can be discharged from air reservoir 170 by forming through-hole 220 in resin film 120 which is positioned between air reservoir 170 and the outside. As a result, first liquid 210 in first channel 130 moves to the second end (air reservoir 170) side by capillary action (a valve open state).

As shown in FIG. 21C, first liquid 210 advances in first channel 130 to small-diameter portion 132. Since small-diameter portion 132 functions as a valve, first liquid 210 cannot advance ahead any more. That is, a portion to small-diameter portion 132 in which first liquid 210 can move corresponds to first channel 130, and the entire portion ahead of an end (the second end side) of small-diameter portion 132 corresponds to air reservoir 170. Eventually, a liquid-liquid interface between first liquid 210 and second liquid 230 is formed in the connection section of first channel 130 with second communication section 520.

By the above procedure, it is possible to form the liquid-liquid interface between first liquid 210 and second liquid 230 at any intended timing.

In addition, in the present embodiment, an example has been described in which small-diameter portion 132 is formed in the vicinity of the connection section of second communication section 520 in first channel 130. However, the position of small-diameter portion 132 is not limited thereto. For example, small-diameter portion 132 may be formed at a position away from the connection section of second communication section 520. In any case, it is possible to suppress outflow of first liquid 210 further forward than small-diameter portion 132 at the time of formation of through-hole 220. Further, when a process of making first liquid 210 continuously flow into first channel 130 is required at the time of formation of through-hole 220, small-diameter portion 132 need not be formed.

[Effects]

Microchannel chip 500 according to the present embodiment can form the liquid-liquid interface between first liquid 210 and second liquid 230 at any intended timing, in addition to the effects of microchannel chip 100 according to Embodiment 1.

For example, in microchannel chip 500 according to the present embodiment, it is possible to continuously perform a reaction process and a cleaning process by using magnetic beads with an antibody supported thereon. Specifically, it is possible to (1) bind an antigen to the antibody in first liquid 210 in first channel 130, (2) form a liquid-liquid interface between first liquid 210 and second liquid 230, (3) move the magnetic beads into second liquid 230 in third channel 510 by using a magnet, and (4) clean the magnetic beads by second liquid 230.

An operation of the magnetic bead in the processes of the above (1) to (4) can be automatically performed by using fluid handling system 300 provided with a magnet. That is, an operation of the magnetic bead can be automatically performed by engaging a magnet with hole portion 326 of coded plate 320, groove 334 of first pin holder 330, and groove 344 of second pin holder 340 and defining the movement of the magnet in advance in accordance with the processes of the above (1) to (4) by the shape or the like of groove 344 of second pin holder 340.

This application claims the right of priority based on Japanese Patent Application No. 2011-158688 filed on Jul. 20, 2011, the entire contents of which including the specification and the drawings are incorporated herein by reference.

INDUSTRIAL APPLICABILITY

The fluid handling device according to the invention is useful as a microchip or a microchannel chip which is used in, for example, a scientific field, a medical field, or the like. Further, the fluid handling system according to the invention is useful as a system for performing, for example, analysis of a trace amount of substance with high accuracy and at high speed.

REFERENCE SIGNS LIST 100, 400, 500 Microchannel chip
110 Chip main body
112a, 112b Through-hole
114 Recess
116a, 116b, 116c Groove
120 Resin film
130 First channel
132 Small-diameter portion
140 Second channel
150 (First) communication section
152 Opening
160 (First) liquid introduction port
170 Air reservoir
180 (First) air discharge port
190 Heating section
210 (First) liquid
220 Through-hole
230 Second liquid
300 Fluid handling system
310 Driving section holder
320 Coded plate
322a to 322e Groove
324 Protrusion
326 Hole portion
330 First pin holder
332a to 332e Through-hole
334 Groove
340 Second pin holder
342a to 342e Through-hole
344 Groove
350 Third pin holder
360 Chip holder
370 Driving section
372 Rotating shaft
380a Pin
382a to 382e Pin accommodation portion
410 Protrusion
510 Third channel
520 Second communication section
530 Second liquid introduction port
540 Second air discharge port

The invention claimed is:

1. A fluid handling device comprising:
a first channel which has a first end and a second end and in which a fluid can move by capillary action;
an air reservoir connected to the second end, the air reservoir being a hermetically-sealed space formed by blocking an opening of a bottomed recess with a resin film, the resin film being positioned so as to enable the air reservoir to communicate with the outside when a through-hole is formed in the resin film;
an air discharge port having an opening where air passes therethrough and communicates with the outside;
a second channel which communicates with the air discharge port; and
a communication section which allows the first channel and the second channel to communicate with each other and which has a cross-sectional area smaller than a cross-sectional area of the second channel, the communication section having a connection section between the communication section and the second channel for preventing the fluid in the communication section from entering into the second channel by the fluid's own surface tension; wherein
the first channel has a first portion starting from the communication section toward the first end and a second portion starting from the communication section toward the second end, and
the first portion and the second portion have uniform width.

2. The fluid handling device according to claim 1, wherein the first channel has a protrusion at a position opposite to an opening of the communication section.

3. The fluid handling device according to claim 1, further comprising: a heating section for forming the through-hole in the resin film, the heating section being provided on the resin film.

4. The fluid handling device according to claim 1, further comprising:
a third channel; and
a second communication section which allows the first channel and the third channel to communicate with each other and has a cross-sectional area smaller than a cross-sectional area of the first channel,
wherein a connection section of the second communication section in the first channel is positioned between a connection section of the communication section in the first channel and the second end.

5. The fluid handling device according to claim 1, wherein the first channel has, at the second end, a small-diameter portion which communicates with the air reservoir.

6. A method of handling a fluid by using the fluid handling device according to claim 1, comprising:

introducing a fluid from the first end into an area between the first end and a connection section of the communication section with the first channel, in the first channel;

forming the through-hole which allows the air reservoir and the outside to communicate with each other; and moving the fluid in the first channel to the second end side by capillary action.

7. The fluid handling method according to claim 6, wherein at least a portion of a wall separating the air reservoir and the outside is the resin film, and the through-hole which allows the air reservoir and the outside to communicate with each other is formed by piercing the resin film with a needle.

8. The fluid handling method according to claim 6, wherein at least a portion of a wall separating the air reservoir and the outside is the resin film, and the through-hole which allows the air reservoir and the outside to communicate with each other is formed by heating the resin film.

9. A fluid handling system comprising:

the fluid handling device according to claim 1; and a valve opening section that forms the through-hole which allows the air reservoir and the outside to communicate with each other.

10. The fluid handling device according to claim 1, wherein the communication section is a tube for moving fluid by capillary action.

11. The fluid handling device according to claim 1, wherein the connection section between the communication section and the second channel has a shape such that a width of the connection section increases from a width of the communication section to a width of the second channel along a cross section of the second channel orthogonal to a flow direction of a fluid in the second channel.

12. A method for handling a fluid with the fluid handling device according to claim 1, wherein the method comprises:

introducing a fluid into the first channel to move the fluid by capillary action into a connection section between the first channel and the communication section and into the connection section between the communication section and the second channel; and forming a through-hole in the resin film blocking the opening of the bottomed recess to discharge air in the first channel from the air reservoir, thereby further moving the fluid in the first channel to a side of the air reservoir by capillary action.

* * * * *